(12) United States Patent
Kojima

(10) Patent No.: US 11,869,711 B2
(45) Date of Patent: Jan. 9, 2024

(54) MAGNETIC CLAMP DEVICE

(71) Applicant: KOSMEK LTD., Kobe (JP)

(72) Inventor: Ryota Kojima, Kobe (JP)

(73) Assignee: KOSMEK LTD.

( * ) Notice: Subject to any disclaimer, the term of this patent is extended or adjusted under 35 U.S.C. 154(b) by 393 days.

(21) Appl. No.: 17/257,441

(22) PCT Filed: May 31, 2019

(86) PCT No.: PCT/JP2019/021664
§ 371 (c)(1),
(2) Date: Dec. 31, 2020

(87) PCT Pub. No.: WO2020/012819
PCT Pub. Date: Jan. 16, 2020

(65) Prior Publication Data
US 2021/0183554 A1    Jun. 17, 2021

(30) Foreign Application Priority Data
Jul. 12, 2018   (JP) ................................. 2018-132370

(51) Int. Cl.
*H01F 7/02* (2006.01)
*B29C 33/32* (2006.01)
*B29C 45/17* (2006.01)

(52) U.S. Cl.
CPC .......... *H01F 7/0252* (2013.01); *B29C 33/32* (2013.01); *B29C 45/1742* (2013.01); *B29C 2045/1746* (2013.01)

(58) Field of Classification Search
CPC ..... H01F 7/0252; H01F 7/0257; B29C 33/32; B29C 45/1742; B29C 2045/1746; B29C 45/1744
See application file for complete search history.

(56) References Cited

U.S. PATENT DOCUMENTS

| 4,401,960 A | * | 8/1983 | Uchikune | ............. | H01F 7/0252 |
| | | | | | 335/304 |
| 4,459,500 A | * | 7/1984 | Miyamoto | ............. | H02K 23/04 |
| | | | | | 310/154.21 |

FOREIGN PATENT DOCUMENTS

| EP | 2127847 A1 * 12/2009 | ............. B29C 33/32 |
| JP | 3164219 B2 * 5/2001 | |

(Continued)

OTHER PUBLICATIONS

International Search Report dated Aug. 13, 2019 issued in International Application No. PCT/JP2019/021664, 2 pages.

*Primary Examiner* — Mohamad A Musleh
(74) *Attorney, Agent, or Firm* — Merek, Blackmon & Voorhees, LLC

(57) ABSTRACT

Provided is a magnetic clamp device that reduces a magnetic flux leaking from a magnetic circuit passing through a permanent magnet and a magnetic pole member. The magnetic clamp device includes: a permanent magnet 20 surrounding a magnetic pole member 10 and disposed on a surface of a plate PL made of a magnetic body that magnetically clamps a mold in a magnetized state; and a reversible magnet 16 capable of reversing polarity and disposed at the rear of the permanent magnet 20. The magnetic pole member 10 is constituted by a plurality of magnetic pole pieces 101, 102, 103, and 104. Each of the magnetic pole pieces has a first lateral surface R with a shape corresponding to the opposite permanent magnet 20, and a second lateral surface T at which adjacent magnetic pole pieces oppose each other. The magnetic pole member 10 moves as the first lateral surfaces R are suction-adsorbed by the permanent magnet 20 without the second lateral surfaces T interfering with each other. The magnetic pole pieces 101, 102, 103, and 104 are held from the front and rear.

4 Claims, 6 Drawing Sheets

(56) References Cited

FOREIGN PATENT DOCUMENTS

| | | | | |
|---|---|---|---|---|
| JP | 2005-246634 | | 9/2005 | |
| JP | 2009-248352 | | 10/2009 | |
| JP | 5385544 | | 10/2009 | |
| JP | 2012148378 | | 8/2012 | |
| JP | 2017-121797 | | 7/2017 | |
| JP | 2017-144525 | | 8/2017 | |
| JP | 2018-43366 | | 3/2018 | |
| JP | 2022064674 A | * | 4/2022 | |
| WO | WO2010/021013 | | 2/2010 | |
| WO | WO-2017056014 A1 | * | 4/2017 | ............ B23Q 17/00 |
| WO | WO-2019165228 A1 | * | 8/2019 | .......... B25J 15/0608 |

\* cited by examiner

MAGNETIC CLAMP DEVICE

FIELD OF THE INVENTION

The present invention relates to a magnetic clamp device.

A magnetic clamp device utilizing magnetic adsorption force is known with respect to mold-fixing of an injection molding machine. The magnetic clamp device is a technique for magnetically fixing a mold by fitting a plate made of a magnetic body on a platen. The plate can be switched between a magnetic circuit closed in the plate and a magnetic circuit passing through the mold by surrounding a magnetic pole member made of a magnetic body with a permanent magnet with non-reversible polarity, disposing a reversible magnet (alnico magnet) at the rear of the permanent magnet, and controlling a magnetic polarity of the alnico magnet by a coil.

Patent literature 1 discloses a magnetic clamp device wherein a circular magnetic pole member is accommodated in a cylinder that is formed by providing a circular accommodating recess on a base and arranging a plurality of permanent magnets with an arc-shaped cross section in a circle along the recess. Further, in patent literature 2, permanent magnets are incorporated in a clamp plate by being arranged on four sides around a square magnetic pole member.

PRIOR ART

Patent Literature

Patent literature 1: Japanese Patent Laid Open Publication No. 2017-144525
Patent literature 2: Japanese Patent No. 5385544

DISCLOSURE OF THE INVENTION

Problems to be Solved by the Invention

In patent literatures 1 and 2, when cores or steel blocks (hereinafter referred to each as a magnetic pole member) are installed in a permanent magnet, it cannot be assembled unless there is a gap between the members in advance by design. Although the gap is necessary for assembling, in the magnetic circuit that passes through the permanent magnet and the magnetic pole member, magnetic flux leaks due to this gap, and the magnetic resistance of the circuit has to be increased.

An object of the present invention is to provide a magnetic clamp device in which magnetic flux leaking from a magnetic circuit that passes through a permanent magnet and a magnetic pole member is reduced.

Means to Solve the Problem

A magnetic clamp device of the present invention includes a plate made of a magnetic body that magnetically clamps a mold, a permanent magnet disposed on a front surface side of the plate so as to surround a magnetic pole member, and a reversible magnet capable of reversing polarity on a rear surface side of the plate. The magnetic pole member is constituted by a plurality of magnetic pole pieces, and each of the magnetic pole pieces has a first lateral surface with a shape corresponding to the opposite permanent magnet and a second lateral surface at which adjacent magnetic pole pieces oppose each other. The second lateral surfaces of the adjacent magnetic pole pieces are arranged with a gap therebetween, the first lateral surface is in contact with the permanent magnet, and the magnetic pole pieces are held from the front surface side and the rear surface side of the plate.

Effects of Invention

According to the present invention, the magnetic pole pieces are free to move, and their relative positions to the permanent magnet are determined by adsorption by the permanent magnet. Therefore, each magnetic pole piece is adsorbed to the permanent magnet with a minimized gap to make contact. According to this, there is an effect that almost no magnetic flux leakage occurs between each magnetic pole piece and the permanent magnet.

BRIEF DESCRIPTION OF THE DRAWINGS

FIG. 1A is a front view, FIG. 1B is an exploded view.

FIG. 2A is a front view and FIG. 2B is an exploded view.

FIG. 3A is an exploded view, FIG. 3B is a view showing a positional relationship between a magnetic pole member and a permanent magnet, and FIG. 3C is a view showing a state during assembly.

FIG. 4A is a view showing a positional relationship between a magnetic pole member and a permanent magnet, and FIG. 4B is a view showing a final positional relationship between the magnetic pole member and the permanent magnet.

PREFERRED EMBODIMENTS OF THE INVENTION

Figure 1A:
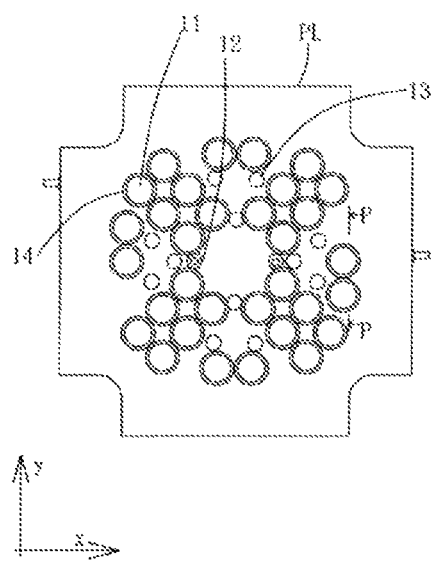
FIGS. 1A and 1B are views showing a magnetic clamp device provided with a circular magnetic pole member.

FIG. 1A shows a plate PL of a magnetic clamp device provided with circular magnetic pole members. Cartesian coordinates X-axis, Y-axis are shown. A large number of magnet blocks 11 are arranged on a front surface of the plate PL. The plate PL is made of a magnetic body, and a large number of circular grooves 14 are provided on the front surface. A part surrounded by a groove 14 corresponds to a magnet block 11.

Figure 1B:
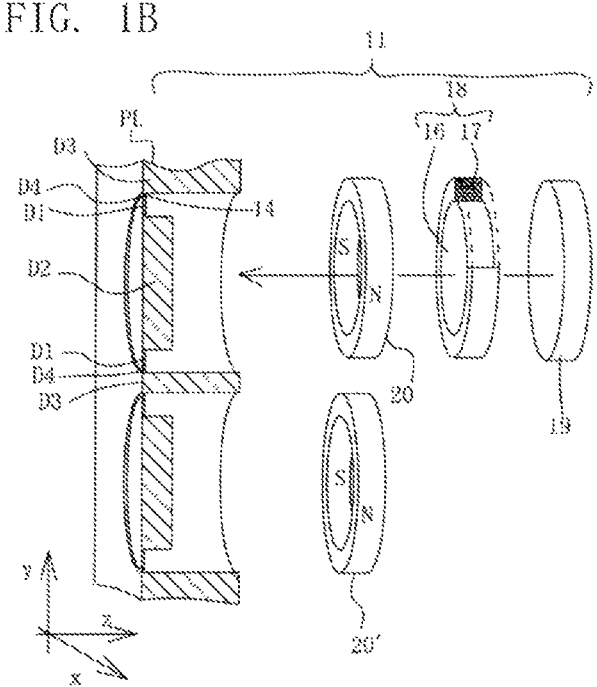

FIG. 1B is an exploded view taken along a line P-P in FIG. 1A. The Z-axis is orthogonal to the X-axis and the Y-axis, and is a directional axis that extends from the front surface of the plate PL adsorbing the mold to the inside of the plate. In the figure, the plate PL is integrally provided with a portion D1 having a small thickness of steel on the Z-axis direction side of the groove 14, and a disc-shaped portion D2 having a large thickness of steel further inside (functions as a pole member). A cylindrical permanent magnet 20 is inserted into the portion D1 having a small thickness of steel from the back side of the plate PL. The permanent magnet 20 has, for example, S pole on the inner peripheral side and N pole on the outer peripheral side of a ring which is an outer shape of the permanent magnet. For example, a neodymium magnet can be used as a permanent magnet 20. On the back side (Z-axis direction side) of the permanent magnet 20, a reversible magnet 18 including a disc-shaped alnico magnet 16 and a coil 17 wound around the outside of the alnico magnet 16 is arranged. A disc-shaped cap 19 (magnetic body) is fitted into the plate PL from the back side (Z-axis direction side) of the reversible magnet 18. Each magnet block 11 includes a portion D2 functioning as a magnetic pole member, a permanent magnet 20, an alnico magnet 16, a coil 17, and a cap 19. The inner peripheral side of the permanent magnet 20 is magnetically coupled to the portion D2, and magnetically coupled to the outer peripheral side (outer yoke D3) of the portion D1 having a reduced thickness on the outer peripheral side. The outer yoke D3 is fitted around the portion D2, the permanent magnet 20, the alnico magnet 16, the coil 17, and the cap 19. The alnico magnet 16 is magnetically coupled to the portion D2 and the cap 19, and an outer peripheral surface of the cap 19 is magnetically coupled to an inner peripheral surface of the outer yoke D3. Further, the portion D4 of the groove 14 is made thinner than the other parts, so that it is easily magnetically saturated. Since the front surface of the plate PL is entirely covered with steel of the plate PL, the permanent magnet 20 and the reversible magnet 18 can be sealed from a work area for mounting the mold M1. The magnetic clamp device is a mono-mag type magnetic clamp device in which the inner peripheral side of the permanent magnet 20 is S pole and the outer peripheral side is N pole and a magnetic circuit is formed by one magnetic block 11.

Figure 1C:
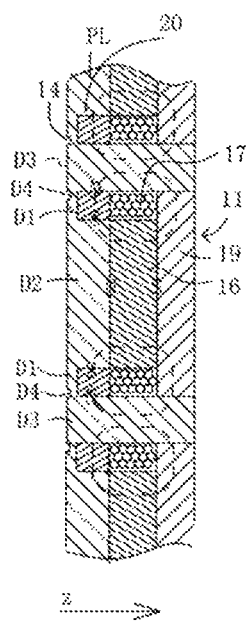
FIG. 1C is a demagnetized magnetic circuit diagram.

FIG. 1C shows a state in which the magnetic clamp device is in a demagnetized state. The alnico magnet 16 is a magnet in which the front side (the left side in the drawing) of the plate PL is N pole and the back side is S pole. Magnetic flux passes through a magnetic circuit formed by the permanent magnet 20, the outer yoke D3, the cap 19, the alnico magnet 16, and the portion D2. In this state, the magnetic flux does not leak to the front surface of the plate PL, and the mold M1 is not adsorbed.

Figure 1D:
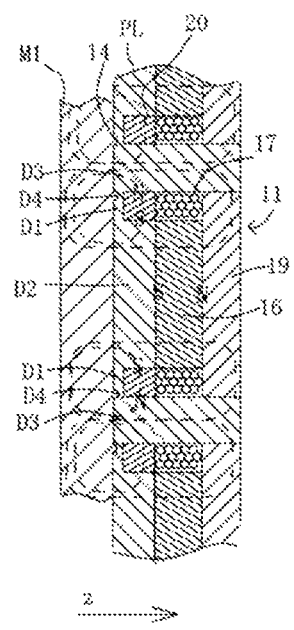
FIG. 1D is a magnetized magnetic circuit diagram.

FIG. 1D shows a state in which the magnetic clamp device is in a magnetized state. The magnetic pole of the alnico magnet 16 is reversed by applying a direct current to the coil 17 from the outside. The alnico magnet 16 is a magnet in which the front side of the plate PL is S pole and the back side thereof is N pole. The polarity of the alnico magnet 16 is reversed, and a direct current should be flowed for the time to hold the required magnetic flux. On the front surface side of the plate PL, both the permanent magnet 20 and the reversible magnet 18 are coupled to the portion D2 as S pole. In a state in which the mold M1 is pressed against the front surface of the plate PL, these magnetic fluxes pass through the mold M1. As a result, a magnetic circuit composed of the permanent magnet 20, the outer yoke D3, the mold M1 and the portion D2, and a magnetic circuit composed of the alnico magnet 16, the outer yoke D3, the mold M1 and the portion D2 are formed. When the mold M1 is lost, the magnetic force outward from the front surface of the plate PL is immediately lost by the magnetic force of the permanent magnet 20 because the alnico magnet 16 does not relatively have high holding power as a permanent magnet.

Although the magnetic clamp device in FIGS. 1A, 1B, 1C and 1D is formed into a mono-mag type magnetic clamp device by arranging the inner side of the permanent magnet 20 as S pole and the outer side thereof as N pole, a bi-mag type magnetic clamp device that forms a magnetic circuit with two adjacent magnet blocks can be configured if the inside of the permanent magnet 20' is inverted to N pole and the outside to S pole.

Figure 2A:
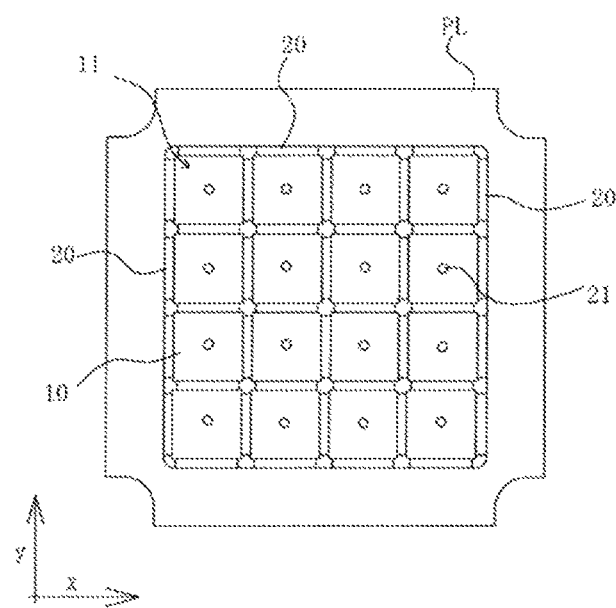
FIGS. 2A and 2B are views showing a magnetic clamp device provided with a square magnetic pole member.
Figure 2B:
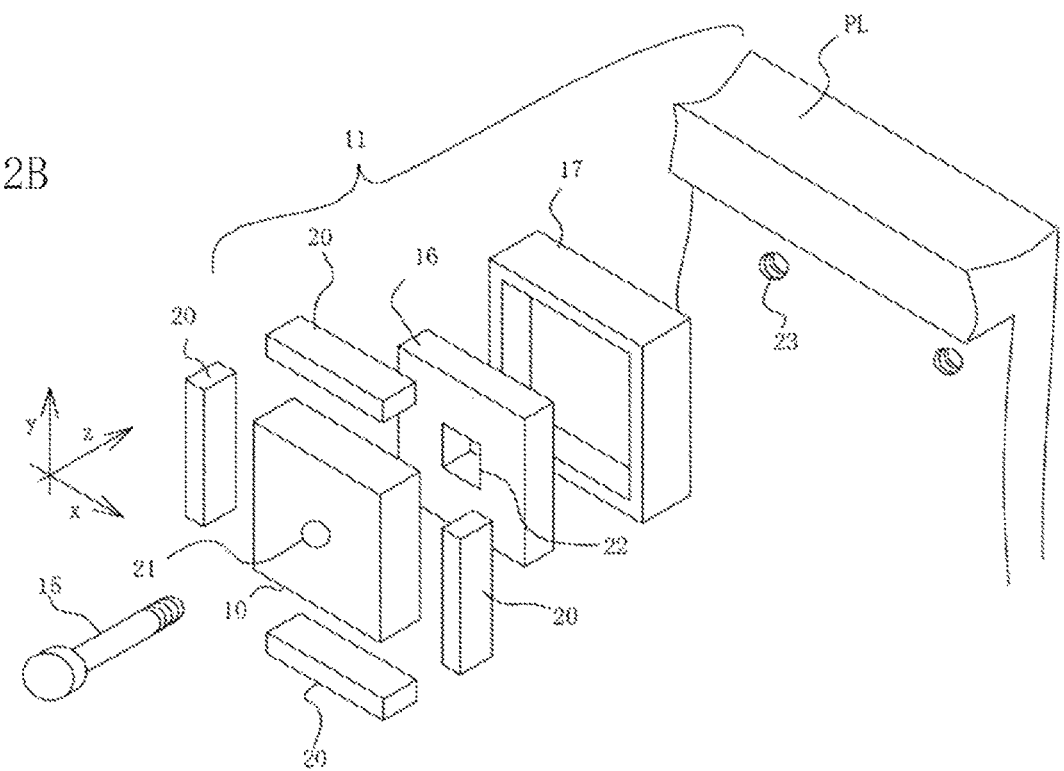

FIGS. 2A and 2B show a magnetic clamp device provided with a square magnetic pole member. The X axis, the Y axis and the Z axis are defined in the same manner as in FIGS. 1A, 1B, 1C and 1D. FIG. 2A is a plan view, and FIG. 2B is an exploded view of one magnet block 11. The magnet blocks 11 are arranged adjacent to each other on the front surface of the plate PL. The magnet block 11 includes a magnetic pole member 10, a plurality of permanent magnets 20 arranged on the outer peripheral side of the magnetic pole member 10, and an alnico magnet 16 arranged on the rear surface side of the magnetic pole member 10. The magnetic pole member 10 and the alnico magnet 16 are formed in a square shape. The permanent magnets 20 between the magnet blocks 11 adjacent to each other in the X-axis direction and the Y-axis direction are also used for both of these magnet blocks 11. Each of the magnet blocks 11 can be controlled into a magnetized state or a demagnetized state by the coil 17 wound around the alnico magnet 16 as in the example in FIGS. 1A, 1B, 1C and 1D. The magnet block 11 is fixed to the plate PL by screwing a bolt 15 into a fixing hole 23 provided to the plate PL through a through hole 21 of the magnetic pole member 10 and a through hole 22 of the alnico magnet 16.

In the magnet blocks 11 in FIGS. 1A, 1B, 1C, 1D, 2A and 2B, the position of each magnet block 11 on the X axis and the Y axis is predetermined with respect to the plate PL. The permanent magnet 20 is arranged between the magnetic pole member 10 and the outer yoke D3, or between adjacent magnetic pole member 10 and magnetic pole members 10. It is necessary to design the permanent magnet 20 to a slightly smaller size including an error so that it can be inserted around the magnetic pole member 10 without any trouble. This is because it is physically difficult to insert the permanent magnet 20 if the dimensions are designed so that there is no gap for fitting with the permanent magnet 20 in all directions around the magnetic pole member 10. On the other hand, the direction of magnetic flux due to the permanent magnet 20 is in a plane consisting of the X axis and the Y axis, and therefore, there is no choice but to make a magnetic circuit through the gap between the magnetic pole member 10 and the permanent magnet 20 thus formed.

Examples of the present invention will be described below. The present invention aims to reduce the magnetic flux leaking from the magnetic circuit passing through the permanent magnet and the magnetic pole member, and will be described based on the following examples.

Example 1

Figure 3A:
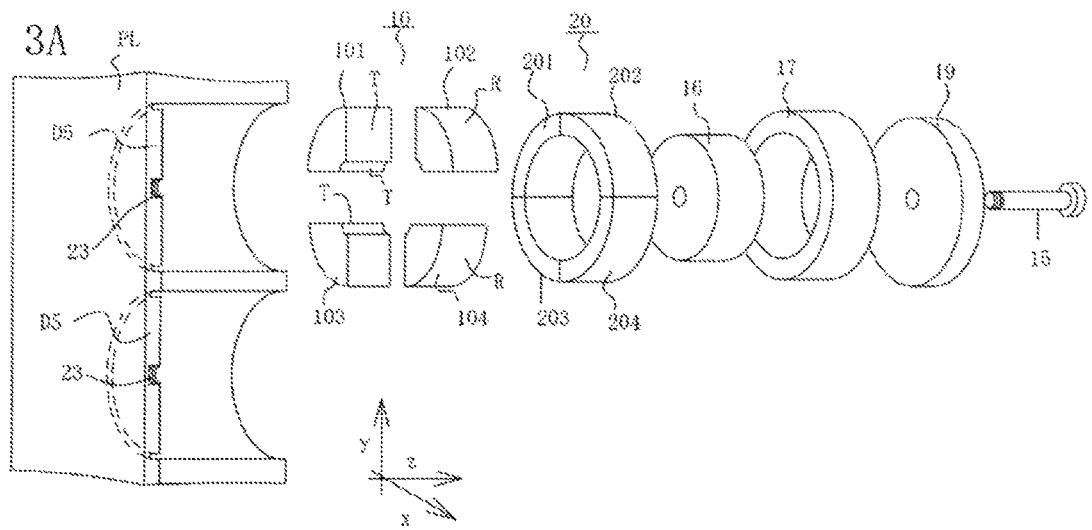
FIGS. 3A, 3B and 3C are views showing Example 1.

Example 1 will be described below with reference to FIGS. 3A, 3B and 3C. Those elements or members shown in FIGS. 3A, 3B and 3C having the same function as the reference numeral given in FIGS. 1A, 1B, 1C and 1D are designated by the same numeral. Example 1 is an embodiment in which the present invention is applied to a magnetic clamp device provided with a circular magnetic pole member in FIGS. 1A, 1B, 1C and 1D. FIG. 3A is an exploded view of a magnet block 11. The difference from the magnetic pole member 10 shown in FIGS. 1A, 1B, 1C and 1D is in the structure of a magnetic pole member 10. In Example 1, the magnetic pole member 10 is divided into a plurality of magnetic pole pieces 101, 102, 103, 104. In the embodiment of FIGS. 1A, 1B, 1C and 1D, the portion D2 that is a part of the plate PL has a function as a magnetic pole member, but in Example 1, the function is divided into the portion that receives magnetic flux from a permanent magnet 20 (hereinafter referred to as a magnetic pole member 10) and the portion of the front surface of the plate PL (front surface portion D5). The front surface portion D5 is a magnetic pole plate that continuously covers the magnetic pole pieces 101, 102, 103, 104 by one sheet. The magnetic pole member 10 is held between the front surface portion D5 and the alnico magnet 16 by restricting the Z-axis movement of the magnetic pole pieces 101, 102, 103, 104.

The magnetic pole pieces 101, 102, 103, 104 will be further described. The magnetic pole pieces 101, 102, 103, 104 are members that have the same shape as the magnetic pole member 10 of FIGS. 1A, 1B, 1C and 1D when they are assembled on a plane consisting of the X axis and the Y axis. In this example, it is circular. The magnetic pole member 10 is radially divided from the center thereof at equal angular intervals. Each of the magnetic pole pieces 101, 102, 103, 104 has a curved surface formed on a part of the side wall of the magnetic pole member 10. This side surface (referred to as the first side surface R) is a curved surface that is as close to the inner diameter of the permanent magnet 20 as the design allows, and thus, when the first side surface R is magnetically adsorbed to the inner peripheral surface of the permanent magnet 20, there is almost no gap between the first side surface R and the inner peripheral surface of the permanent magnet 20. On the other hand, the other side surface (referred to as the second side surface T) faces the side surface of another adjacent magnetic pole piece. In FIGS. 3A, 3B and 3C, the permanent magnet 20 is also divided into a plurality of arc-shaped permanent magnet pieces 201, 202, 203, 204.

Figure 3B:
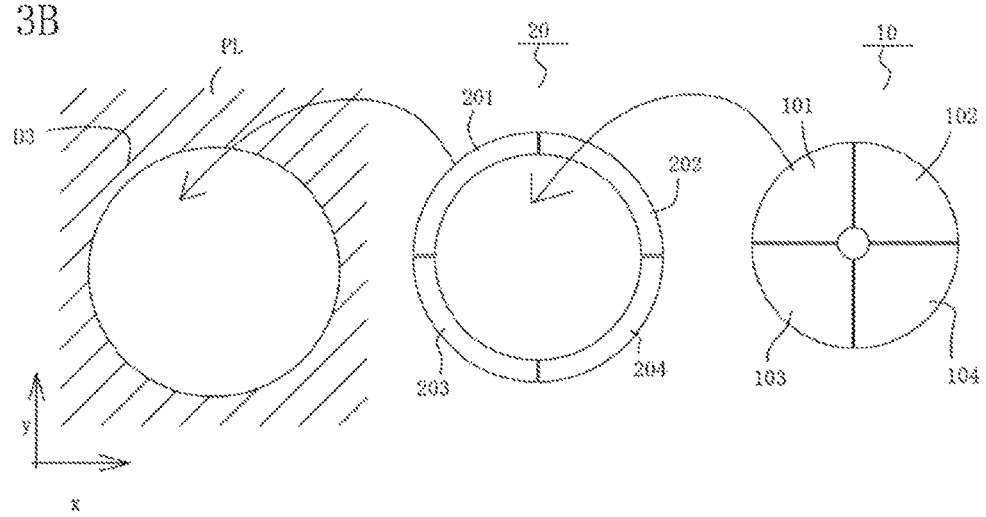
Figure 3C:
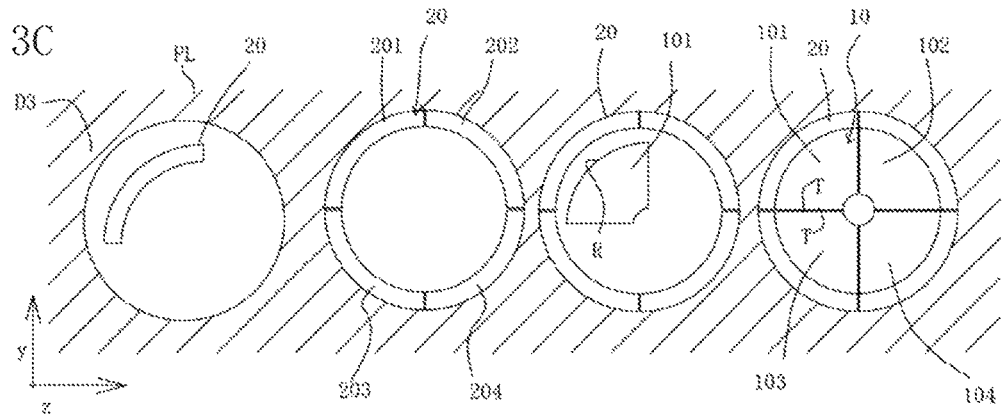

FIG. 3B is a view showing a positional relationship between the magnetic pole member 10 and the permanent magnet 20. The permanent magnet pieces 201, 202, 203, 204 are fitted onto the outer yoke D3. The magnetic pole pieces are installed inside the permanent magnet 20 that is a combination of a plurality of magnets to form a cylindrical shape. FIG. 3C is a view showing an assembly process. The curvature radius of a curved surface of the permanent magnet piece is substantially the same as the inner diameter of the outer yoke D3, and dimensioned so as to minimize the gap due to the difference with the inner peripheral diameter of the outer yoke D3. When the permanent magnet pieces 201, 202, 203, 204 are accommodated in the outer yoke D3, they are adsorbed to the outer yoke D3 by their own magnetic force.

Next, when the magnetic pole pieces 101, 102, 103, 104 are inserted on the inner peripheral side of the permanent magnet 20, the first side surface R of each magnetic pole piece is adsorbed to and abutted by the opposing inner peripheral surfaces of the permanent magnet 20 by a strong magnetic force. Since the magnetic pole pieces 101, 102, 103, 104 are free to move before being fixed by the bolt 15 described below, the position relative to the permanent magnet 20 is determined by the adsorption due to the permanent magnet 20. Since the outer diameter of the arc of the permanent magnet piece is designed so as to substantially match the inner diameter of the outer yoke D3, the magnetic pole pieces 101, 102, 103, 104 are abutted to the permanent magnet 20 in a state that there is almost no gap. Therefore, the magnetic flux is hardly reduced due to the gaps between the magnetic pole pieces 101, 102, 103, 104 and the permanent magnet 20. When the pole pieces are adsorbed and moved, the second side surfaces T do not interfere with each other. Further, although a gap is formed between the second side surfaces T, no magnetic circuit is planned for the magnetic flux to cross this gap, so that it does not lead to an increase in magnetic resistance. A fixing hole 23 having female screw threads is provided in the front surface portion D5, and the cap 19, the alnico magnet 16, and the magnetic pole member 10 are fixed to the front surface portion D5 from the cap 19 side with the bolt 15. Since the fixing in the Z-axis direction is made in close contact with each other by the bolt 15, the gap that interferes with the magnetic flux in the Z-axis direction is minimized.

Although the permanent magnet 20 is divided into a plurality of arc-shaped permanent magnet pieces 201, 202, 203, 204 in Example 1, it may be a cylindrical permanent magnet that is not divided. In this case, a fitting gap is required between the permanent magnet 20 and the plate PL, but a fitting gap between the permanent magnet 20 and the magnetic pole member 10 can be reduced.

Example 2

Figure 4A:
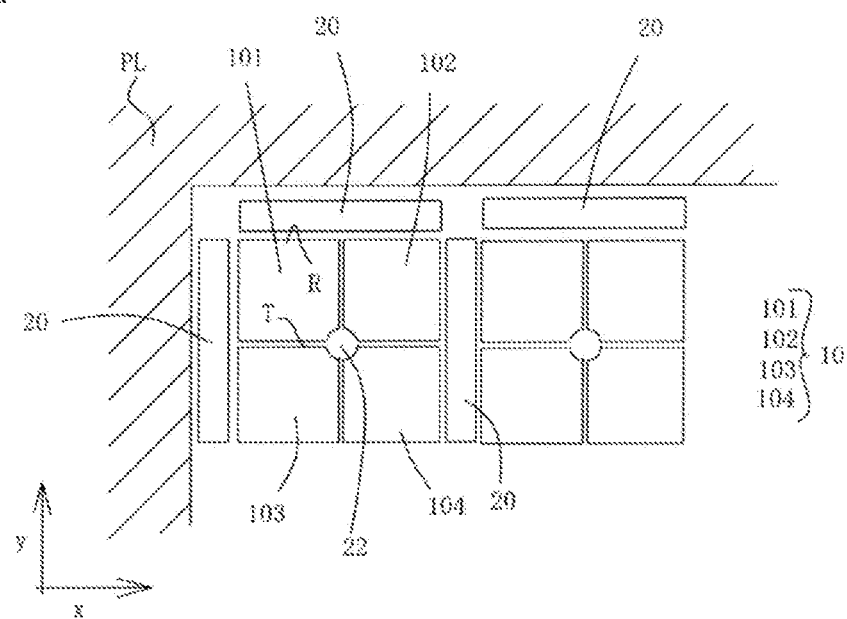
FIGS. 4A and 4B are views showing Example 2.
Figure 4B:
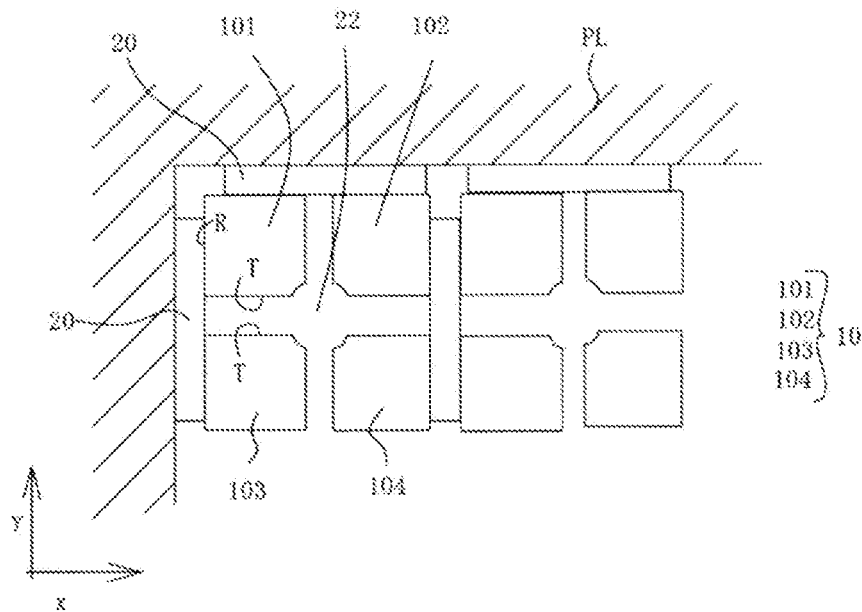

FIGS. 4A and 4B show views of a second embodiment. Those elements or members shown in FIGS. 4A and 4B having the same functions as the reference numerals given in FIGS. 2A and 2B are given the same reference numerals. This is an example in which the present invention is applied to a magnetic clamp device having the square magnetic pole member 10 of FIGS. 2A and 2B. The magnetic pole member 10 is radially divided into four magnetic pole pieces 101, 102, 103, 104 from the center. FIG. 4A shows that the permanent magnets 20 are arranged around the magnetic pole members 10. FIG. 4B shows the arrangement positions of the permanent magnets 20 and the pole pieces 101, 102, 103, 104 after assembling. The magnetic pole pieces 101, 102, 103, 104 are adsorbed to the permanent magnets 20. In the present example, unlike Example 1, the contact surfaces of the permanent magnet 20 and the first side surfaces R of the magnetic pole pieces 101, 102, 103, 104 are not curved surfaces but flat surfaces. Therefore, contrary to Example 1, in fixing the permanent magnets 20, the magnetic pole pieces 101, 102, 103, 104 and the plate PL to one another, if gaps are designed so that they can be fitted, the permanent magnets 20 arranged on the plate PL adsorb each of the magnetic pole pieces 101, 102, 103, 104. According to this, it is possible to eliminate each gap formed between the permanent magnets 20 and the magnetic pole pieces 101, 102, 103, 104. In this figure, it is illustrated that the second side faces T are largely separated and the magnetic pole pieces 101, 102, 103, 104 are greatly moved, but in actual dimensions, they are only slightly moved around the through holes through which the bolts are inserted. In Example 2, not shown in the figure, a magnetic plate for continuously limiting the movement of the magnetic pole pieces 101, 102, 103, 104 in the Z-axis direction by one sheet needs to be provided on the front surface side of the magnetic pole pieces 101, 102, 103, 104.

Example 3

Figure 5A:
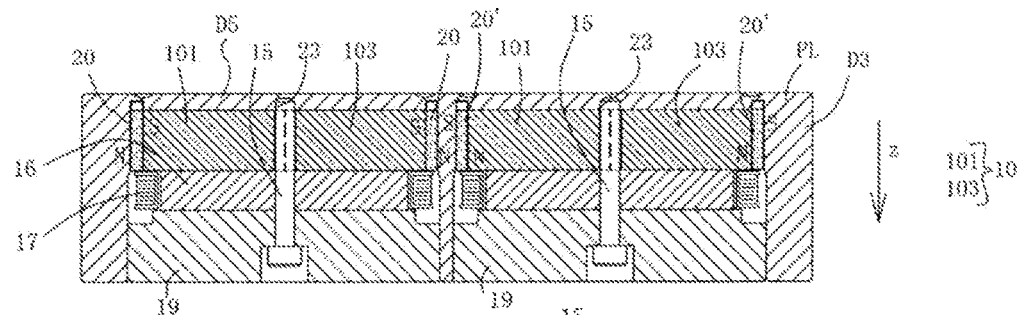
FIGS. 5A, 5B, 5C, 5D and 5E are views showing another embodiment.

FIGS. 5A, 5B, 5C and 5D show various structures for fixing the permanent magnets 20, the magnetic pole members 10 (only the magnetic pole pieces 101 and 103 are shown because the magnetic pole pieces 102 and 104 are not shown in the figure) and the alnico magnets 16 on the plate PL. It should be noted that components having the same functions as the reference numerals given in other figures are given the same reference numerals. FIG. 5A shows a magnetic clamp device in which the front surface portion D5 corresponding to Example 1 is integrated with the plate PL. This is a bi-mag type magnetic clamp device in which the width of the outer yoke D3 is reduced so that the polarity of the permanent magnet 20 is constructed in S pole on the inner peripheral side and N pole on the outer peripheral side, and so that the polarity of the permanent magnet 20' is constructed in N pole on the inner peripheral side and S pole on the outer peripheral side.

Figure 5B:
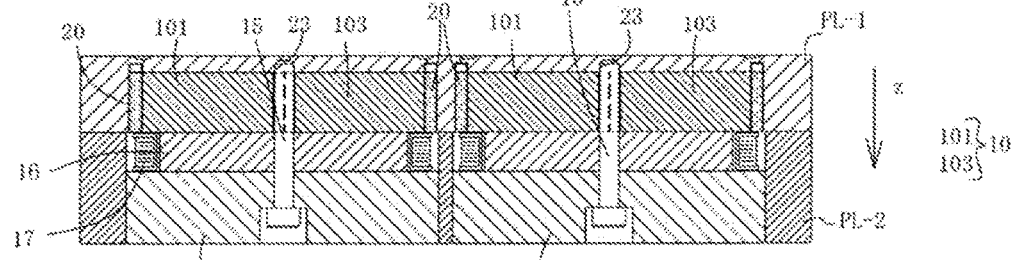

FIG. 5B is different from the structure of FIG. 5A in that the plate PL is divided into a front surface part PL-1 and a rear surface part PL-2 from the middle in the Z-axis direction.

Figure 5C:
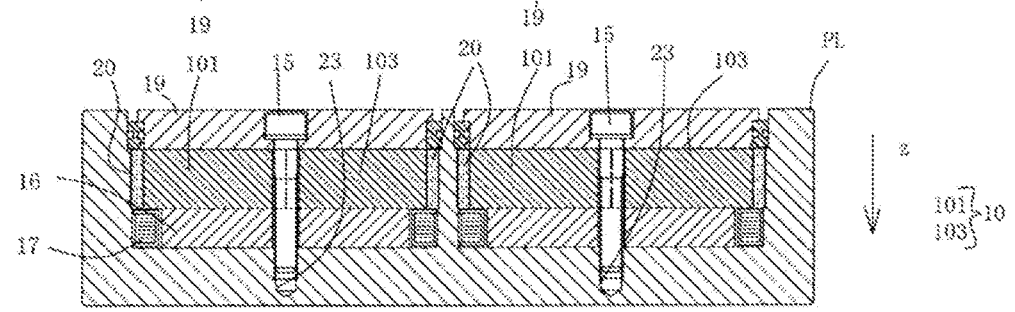

FIG. 5C shows almost the same structure as FIG. 5A, except that the plate PL and the cap 19 are located opposite to each other on the front side and the back side in the Z-axis direction. FIG. 5C shows a form in which the front side and the back side of FIG. 5A are opposite in the Z-axis direction. That is, the cap 19 is arranged on the front side, and a front surface member is arranged on the back side. The arrangement of the permanent magnet, the magnetic pole member and the alnico magnet is the same as the structure of FIG. 5A. A seal is provided to isolate the permanent magnet from an environment on the front surface of the plate PL.

Figure 5D:
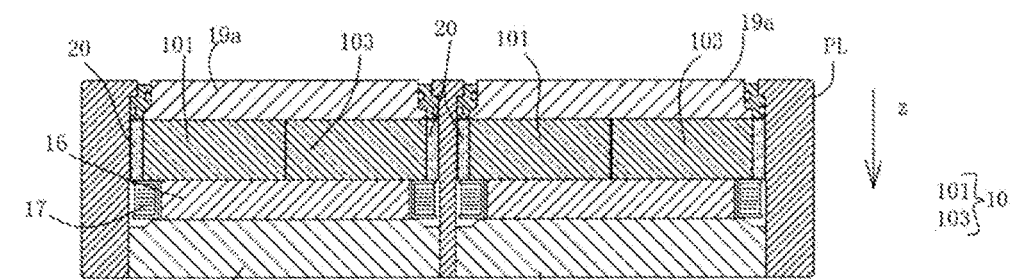
Figure 5E:
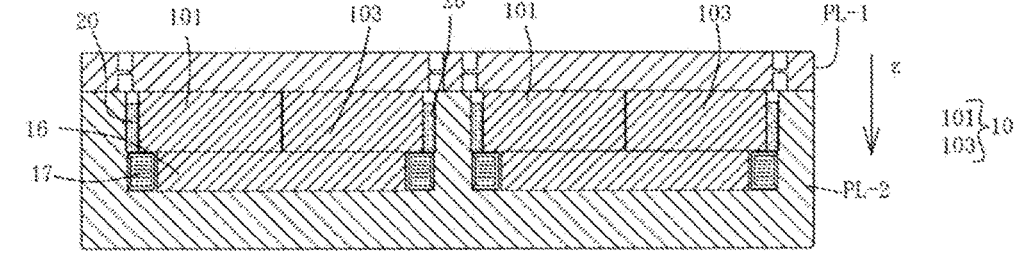

FIG. 5D shows a structure in which caps 19a and 19b are provided on the front side and the back side in the structure of FIG. 5C to sandwich the permanent magnet 20, the magnetic pole member 10 and the alnico magnet 16. In FIG. 5E, the plate PL is divided into the front surface part PL-1 and the rear surface part PL-2 from the middle in the Z-axis direction so as to sandwich across the plurality of permanent magnets 20, magnetic pole members 10 and alnico magnets 16. As apparent from FIGS. 5A to 5E, the magnetic pole member 10 is divided into the magnetic pole pieces 101 to 104 so as to move freely move. Therefore, when the magnetic pole member 10 is adsorbed to the permanent magnet 20, its mechanical position needs to be fixed. In these examples, each magnetic pole piece is covered with one magnetic plate (in each example, the cap 19 or the plate PL has the function) from the Z-axis direction to be held mechanically between the magnetic plate and the alnico magnet 16.

Figure 6A:
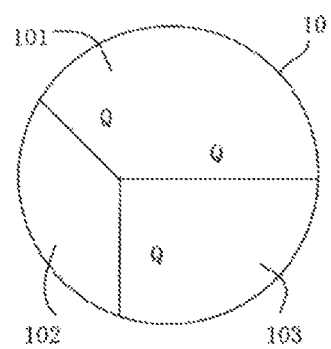
FIGS. 6A, 6B, 6C, 6D, 6E, 6F, 6G, 6H, 6I and 6J are views showing another division mode of a magnetic pole member.
Figure 6B:
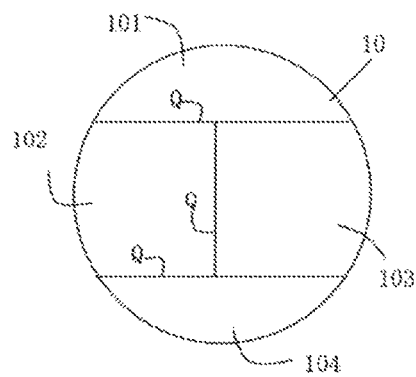
Figure 6C:
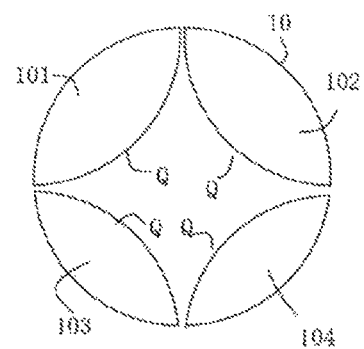
Figure 6D:
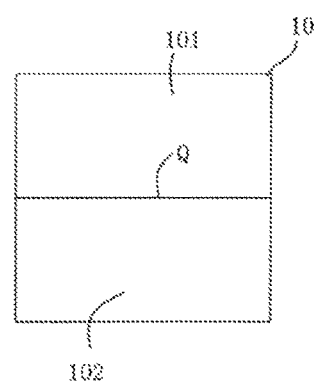
Figure 6E:
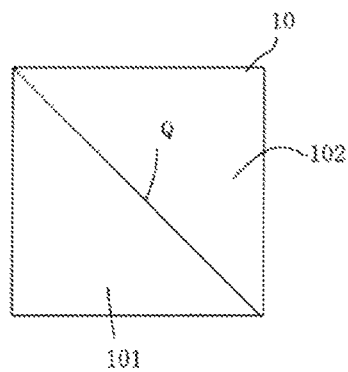
Figure 6F:
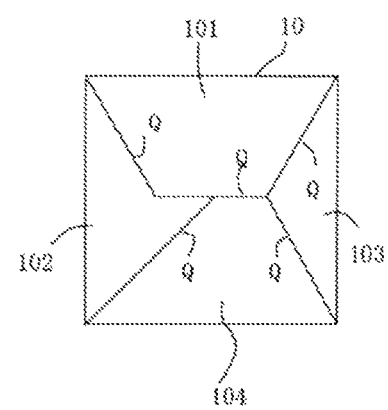

FIGS. 6A to 6J show another division form of the magnetic pole member 10. FIGS. 6A to 6C show examples of other division forms of the circular magnetic pole member 10, FIGS. 6D to 6F show examples of other division forms of the square magnetic pole member 10, and FIGS. 6G to 6J show examples of division forms of polygonal magnetic pole member. With respect to the polygonal magnetic pole member 10, the polygonal permanent magnets 20 or a plurality of plate-shaped permanent magnets 20 arranged in a polygonal shape surround the periphery of the magnetic pole member 10 (however, it is not shown).

In the division form of FIG. 6A, the center of division is eccentric, and the size of each pole piece 101, 102, 103 is different. In the division form of FIG. 6B, the center of division is two places, and the size of each pole piece 101, 102, 103, 104 is different. The division form of FIG. 6C has a large defect part in the center. In each case, when the magnetic pole pieces 101, 102, 103, 104 are adsorbed to the cylindrical permanent magnet 20, the second side surfaces divided by an inner dividing line Q of each magnetic pole piece 101, 102, 103, 104 are separated from each other. The magnetic pole pieces 101, 102, 103, 104 are adsorbed to the permanent magnet 20 without interfering with each other, respectively.

The division form of FIG. 6D is formed by being divided in the middle of two sides of a square (top and bottom opposing sides in the figure). In this configuration, the permanent magnet 20 is closely contacted up and down only, and may not be closely contacted left to right. FIG. 6E shows a form of division by an inner division line Q passing through corners of a square. FIG. 6F shows a form of division by an inner division line Q passing through corners of a square as in FIG. 6E. In any of the forms, the second side surfaces divided by the inner division line Q of each magnetic pole piece are oriented away from each other, and the magnetic pole pieces are adsorbed to the permanent magnet 20 without interfering with each other. The inner division lines Q need only be set so that the second side surfaces do not interfere with each other when the magnetic pole pieces are adsorbed to the permanent magnet 20, so that the inner division lines Q may be divided so that the defect part occurs in the magnetic pole member 10.

Figure 6G:
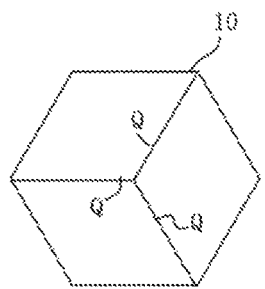
Figure 6H:
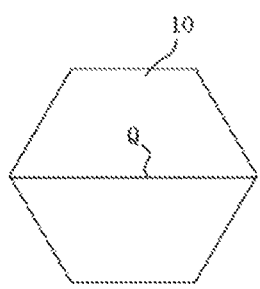
Figure 6I:
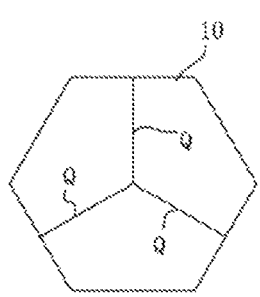
Figure 6J:
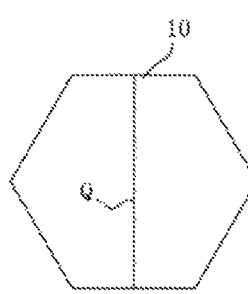

The division forms of FIGS. 6G and 6H are formed by being divided by inner division lines Q passing through the vertices of a polygon. The division forms of FIGS. 6I and 6J are formed by being divided by inner division lines Q passing through the middle of a side of a polygon. In any of the forms, the second side surfaces divided by the inner division lines Q of each magnetic pole piece are separated from each other, and the magnetic pole pieces are adsorbed to the permanent magnet 20 without interfering with each other.

Although the caps 19, 19a, and 19b are magnetic bodies that connect the magnetic circuit between the alnico magnet 16 and the outer yoke D3, the outer peripheral surfaces of the caps 19, 19a, 19b in the above mentioned examples are magnetically coupled to the inner peripheral surfaces of the outer yoke D3. On the other hand, also in the fitting of the caps 19, 19a, 19b and the outer yoke D3, it is necessary to previously provide gaps for fitting. Therefore, in order to make the gaps for fitting as small as possible, the caps 19, 19a and 19b may be divided into a plurality of divided pieces after the shapes of the caps 19, 19a and 19b are made as close as possible to the shape of the inner peripheral surface of the outer yoke D3 as in the divided form of each magnetic pole member 10 shown in FIGS. 3A, 3B and 3C, FIGS. 4A and 4B, and FIGS. 6A to 6J. When the magnetic pole members 10 of FIGS. 3A, 3B and 3C, FIGS. 4A and 4B, and FIGS. 6A to 6J are regarded as the caps 19, 19a, and 19b, and the magnetic pole pieces 101, 102, 103, and 104 are regarded as divided pieces, respectively, a side surface that is as close as possible to the inner peripheral surface of the outer yoke D3 to be connected of the side surfaces of divided pieces of the caps 19, 19a, and 19b is defined as a third side surface, and side surfaces facing the side surfaces of another adjacent divided piece can be defined as fourth side surfaces. When the divided pieces of the caps 19, 19a, and 19b form a magnetic circuit between the alnico magnet 16 and the outer yoke D3, the fourth side surfaces of the divided pieces are separated from each other and the third side surfaces are adsorbed to the outer yoke D3.

Each divided piece of the caps 19, 19a, and 19b is fixed by pouring resin into each gap of the fourth side surfaces or pressing from behind after each third side surface is adsorbed to the outer yoke D3.

DESCRIPTION OF SYMBOLS 10 magnetic member
11 magnet block
14 groove
15 bolt
16 alnico magnet
17 coil
18 reversible magnet
19 cap
19a, 19b cap 20 permanent magnet
21 through hole
22 through hole
23 fixing hole
101, 102, 103, 104 magnetic pole piece
201, 202, 203, 204 permanent magnet piece

The invention claimed is:

1. A magnetic clamp device having a plate including a magnetic body for magnetically clamping a mold, a permanent magnet disposed adjacent a front side of said plate so as to surround a magnetic pole member, and a reversible magnet capable of reversing polarity disposed adjacent a back side of said plate, wherein said magnetic pole member includes a plurality of magnetic pole pieces, each of said magnetic pole pieces having a first surface with a shape corresponding to an opposing surface of the permanent magnet and a second surface opposing an adjacent magnetic pole piece, second surfaces of adjacent magnetic pole pieces being arranged with a gap therebetween, and said first surface being in contact with said permanent magnet, and said magnetic pole pieces are held in position from the front side and the back side of the plate.

2. The magnetic clamp device according to claim 1, wherein the magnetic body of said plate includes a magnetic portion that continuously covers each of the plurality of magnetic pole pieces wherein the magnetic portion of the magnetic body of said plate is provided on a front side of each of the plurality of magnetic pole pieces, and the plurality of magnetic pole pieces are held between the reversible magnet and the magnetic portion of the magnetic body of said plate.

3. The magnetic clamp device according to claim 1, wherein the permanent magnet has a plurality of permanent magnetic pole pieces surrounding a periphery of the magnetic pole member.

4. The magnetic clamp device according to claim 1, further comprising:

a cap of a magnetic body provided rearward of the reversible magnet, and an outer yoke for externally fitting a periphery of said cap, wherein said cap includes a plurality of divided pieces, each divided piece having a third side surface in a shape corresponding to a facing surface of the outer yoke and a fourth side surface, the fourth side surface of one of the plurality of divided pieces faces the fourth side surface of another of the plurality of divided pieces, and wherein the fourth side of the one of the plurality of divided pieces and the fourth side surface of the another of the plurality of divided pieces are arranged with a gap therebetween, and the third side surfaces of the one of the plurality of divided pieces and the another of the plurality of divided pieces are in contact with the outer yoke.

* * * * *